United States Patent
Wang et al.

(10) Patent No.: US 11,186,309 B2
(45) Date of Patent: Nov. 30, 2021

(54) ACTIVE STEERING SYSTEM USING PLANETARY GEAR SET WITH LESS TOOTH DIFFERENCE AND CONTROL METHOD THEREOF

(71) Applicant: Jilin University, Jilin (CN)

(72) Inventors: Junnian Wang, Jilin (CN); Dedong Guo, Jilin (CN); Zheng Luo, Jilin (CN)

(73) Assignee: Jilin University, Changchun (CN)

( * ) Notice: Subject to any disclaimer, the term of this patent is extended or adjusted under 35 U.S.C. 154(b) by 391 days.

(21) Appl. No.: 16/383,512

(22) Filed: Apr. 12, 2019

(65) Prior Publication Data

US 2019/0351933 A1 Nov. 21, 2019

(30) Foreign Application Priority Data

May 17, 2018 (CN) .......................... 201810470674.6

(51) Int. Cl.
| | |
|---|---|
| *B62D 3/12* | (2006.01) |
| *B62D 3/14* | (2006.01) |
| *B62D 5/09* | (2006.01) |
| *B62D 6/08* | (2006.01) |

(52) U.S. Cl.
CPC ................ *B62D 3/12* (2013.01); *B62D 3/14* (2013.01); *B62D 5/091* (2013.01); *B62D 6/08* (2013.01)

(58) Field of Classification Search
CPC .. B62D 3/12; B62D 3/14; F16H 49/00; F16H 49/001; F16H 2001/323; F16H 21/14
USPC ............................................................. 74/390
See application file for complete search history.

(56) References Cited

U.S. PATENT DOCUMENTS

2016/0031475 A1* 2/2016 Wang .................... B62D 5/008
180/406

* cited by examiner

*Primary Examiner* — Randell J Krug (57) ABSTRACT

An active steering system using planetary gear set with less tooth difference and a control method thereof. The system includes a first input shaft with one end connected to a steering wheel of an automobile and the other end fixedly sleeved with a first gear; a ring gear sleeve, where a ring gear is fixedly mounted in the ring gear sleeve circumferentially, and a hollow shaft protrudes from a center of an end of the ring gear sleeve and is fixedly sleeved with a second gear engaged with the first gear; a second input shaft with one end fixedly connected to an output end of a coupled motor and the other end fixedly sleeved with a third gear; an eccentric shaft with one end fixedly sleeved with a fourth gear engaged with the third gear and the other end sleeved in the hollow shaft and eccentrically provided with a boss.

10 Claims, 10 Drawing Sheets

ACTIVE STEERING SYSTEM USING PLANETARY GEAR SET WITH LESS TOOTH DIFFERENCE AND CONTROL METHOD THEREOF

CROSS-REFERENCE TO RELATED APPLICATIONS

This application claims the benefit of priority from Chinese Patent Application No. CN 201810470674.6, filed on May 17, 2018. The content of the aforementioned application, including any intervening amendments thereto, is incorporated herein by reference in its entirety.

TECHNICAL FIELD

The present invention relates to automobile active steering system, and more particularly to an active steering system using planetary gear set with less tooth difference and a control method thereof.

BACKGROUND OF THE INVENTION

The performance of an automobile steering system has a great influence on the safety, handling stability of the automobile and driving pleasure. The performance of the automobile steering system is becoming increasingly excellent as the automobile steering system has evolved from the original mechanical steering system to the modern-day steering system, but it basically fails to combine "handiness" and "dexterity" and generally adopts a relatively suitable fixed transmission ratio as trade-off. Although there are some steering gears with variable transmission ratios in the prior arts, for example, with variable-pitch racks, the transmission ratios vary little and cannot be changed after manufactured, as well as its manufacturing process is a little hard to accomplish.

The automobile active steering system can effectively solve this problem, such as the AFS system (BMW auto company). By arranging a 2K-H type single-row planetary gear-set angle coupling mechanism on the steering shaft, the automobile active steering system can apply a steering angle which is independent of a steering angle applied by a driver through the steering wheel to the steering gear by controller and then correct the front wheel angle according to the travelling condition of the vehicle. At the same time, compared to the steer-by-wire system, the automobile active steering system preserves the mechanical connection between the steering wheel and the steering gear, improving the reliability of the steering system and allowing for a reliable road feel feedback to the driver.

In addition, there are some patents for active steering systems throughout the world, but most of them use double-row planetary gear mechanisms with more complicated structures.

SUMMARY OF THE INVENTION

An object of the present invention is to design and develop an active steering system using planetary gear set with less tooth difference. By adding an angle coupling mechanism on the steering shaft, it is possible to apply a steering angle which is independent of a steering angle applied by a driver through the steering wheel to the steering gear and then correct the front wheel angle according to the driving condition of the automobile. The active steering system using planetary gear set with less tooth difference has a simple structure.

Another object of the present invention is to design and develop a method for controlling the active steering system using planetary gear set with less tooth difference. By collecting the driving condition of the automobile through the active steering system controller, the steering angle output by the coupled motor is determined, thereby realizing active steering of the automobile.

The technical solution provided by the invention is as follows.

An active steering system using planetary gear set with less tooth difference, comprising:

a first input shaft, wherein one end of the first input shaft is connected to a steering wheel of an automobile, and the other end of the first input shaft is fixedly sleeved with a first gear;

a ring gear sleeve, wherein a ring gear is fixedly mounted in the ring gear sleeve in a circumferential direction, and a hollow shaft protrudes from a center of one end of the ring gear sleeve and is fixedly sleeved with a second gear that is engageable with the first gear;

a second input shaft, wherein one end of the second input shaft is fixedly connected to an output end of a coupled motor, and the other end of the second input shaft is fixedly sleeved with a third gear;

an eccentric shaft, wherein one end of the eccentric shaft is fixedly sleeved with a fourth gear that is engageable with the third gear, and the other end of the eccentric shaft is sleeved in the hollow shaft;

a planetary gear engaging with and rotating relative to the ring gear, wherein the planetary gear is provided with a plurality of first pin holes spaced apart in a circumferential direction; wherein the eccentric shaft is eccentrically provided with a boss engaged with a center bore of the planetary gear in a clearance fit;

a plurality of pins each including a first journal, a second journal and a third journal, wherein the first journal is arranged to be eccentric to the second journal, the second journal is arranged to be concentric to the third journal, and the first journal is engaged with one of the plurality of the first pin holes in a clearance fit;

an output shaft disc provided with a plurality of second pin holes spaced apart in a circumferential direction, wherein the third journal is respectively engaged with one of the plurality of second pin holes in a clearance fit, and the output shaft disc is fixedly connected to a steering gear of the automobile.

In some embodiments, an eccentricity between the eccentric shaft and the boss is the same as an eccentricity between the first journal and the second journal.

In some embodiments, one end of the eccentric shaft is provided with a first shaft journal; and a plurality of grooves spaced apart are arranged at an end of the first shaft journal away from the eccentric shaft in a circumferential direction.

In some embodiments, the active steering system using planetary gear set with less tooth difference further includes:

an electromagnet axially provided with a shear pin, wherein a spring is arranged between the electromagnet and the shear pin;

when the electromagnet is de-energized, the shear pin moves away from the electromagnet by resilience of the spring and engages with the groove, such that the eccentric shaft is locked; when the electromagnet is energized, the shear pin compresses the spring to move close to the electromagnet and is disengaged from the groove, such that the eccentric shaft is unlocked.

In some embodiments, the active steering system using planetary gear set with less tooth difference further includes:

a first ring groove arranged at an end of the hollow shaft away from the ring gear sleeve and provided with a first circlip for axially fixing the eccentric shaft;

a second ring groove arranged outside the hollow shaft between the first ring groove and the ring gear sleeve and provided with a second circlip for axially fixing the second gear.

In some embodiments, the active steering system using planetary gear set with less tooth difference further includes:

a first housing; a second housing detachably connected to the first housing; an electromagnet box fixedly disposed on the first housing, wherein the electromagnet is fixedly disposed on the electromagnet box;

a hollow connecting shaft protruding from a center of an end of the output shaft disc for fixed connection to the steering gear of the automobile;

wherein two ends of the first input shaft are rotatably supported on the first housing and the second housing, respectively; an end of the second input shaft is rotatably supported on the first housing; one end of the eccentric shaft is rotatably supported on the first housing, and the other end of the eccentric shaft is rotatably supported in the hollow shaft; the hollow shaft is rotatably supported on the second housing; the hollow connecting shaft is rotatably supported on the second housing.

In some embodiments, the active steering system using planetary gear set with less tooth difference further includes:

a rotary valve fixedly connected to the hollow connecting shaft;

the steering gear, including a steering pinion and a steering rack, an upper end of the steering pinion being fixedly connected to an output end of the rotary valve;

a steering gear case, wherein the steering rack is arranged in the steering gear case, a lower end of the steering pinion engages with the steering rack, and the steering pinion is axially movable along the steering gear case;

a hydraulic cylinder, wherein an end of the hydraulic cylinder is fixedly connected to an end of the steering gear case;

wherein the hydraulic cylinder is provided with a piston rod; one end of the piston rod is fixedly connected to one end of the steering rack and the other end of the piston rod is connected to a first tie rod; and the other end of the steering rack is connected to a second tie rod;

a first dust cover sleeved on the hydraulic cylinder, wherein one end of the first dust cover is sealingly connected to another end of the hydraulic cylinder, and the other end of the first dust cover is sealingly connected to a diameter-reduced position of an end of the piston rod;

a second dust cover sleeved on the steering gear case, one end of the second dust cover being sealingly connected to another end of the steering gear case, and the other end of the second dust cover being sealingly connected to a diameter-reduced position of an end of the steering rack.

In some embodiments, the active steering system using planetary gear set with less tooth difference further includes:

a steering shaft, an end of the steering shaft being fixedly connected to the steering wheel of the automobile;

a steering transmission shaft, one end of the steering transmission shaft being connected to another end of the steering shaft via a first universal joint and the other end of the steering transmission shaft being connected to the first input shaft via a second universal joint.

The present invention also provides a method for controlling the active steering system using planetary gear set with less tooth difference, including:

S1: acquiring, by the CAN bus, an automobile speed;

S2: acquiring a steering system transmission ratio by reading a relationship data sheet of the steering system transmission ratio and the automobile speed;

S3: collecting, by the active steering system controller, signals of each sensor including steering wheel angle signal and steering wheel torque signal;

S4: calculating the steering angle to be output by the coupled motor according to the steering wheel angle, the signal measured by the torque sensors and the steering system gear ratio under current operating conditions;

S5: controlling, by the coupled motor controller, the coupled motor to output a steering angle to realize active steering of the automobile.

In some embodiments, the method further comprises: before S2, determining the working state of the coupled motor; if the coupled motor fails, controlling, by the coupled motor controller, the coupled motor to stop working and the electromagnet to de-energize; wherein the shear pin pops out to lock the eccentric shaft.

The present invention has following beneficial effects:

1. The active steering system of the present invention can be matched with various types of power steering systems including hydraulic power steering systems and electric power steering systems, and basically may not affect the installation and arrangement of the original power steering system.

2. The active steering system according to the present invention is designed with fewer parts and an anti-failure protection device, thereby providing a high system reliability.

3. The planetary gear set with less tooth difference according to the present invention has a wide range of transmission ratios, which contributes to the selection of the coupled motor and the automobile integration.

4. The active steering system of the present invention can be used in combination with various types of steering gears.

5. The coupled motor of the present invention is arranged in parallel with the axis of the steering shaft, which can effectively reduce the radial dimension of the entire system.

DETAILED DESCRIPTION OF EMBODIMENTS

The present invention will be further described in detail below with reference to the embodiments and the accompanying drawings.

It should be understood that terms such as "having", "comprising" and "including" used herein do not necessarily indicate the existence or addition of one or more other elements or combinations thereof.

FIGS. 1-10 illustrate an embodiment of the present invention. An active steering system using planetary gear set with less tooth difference includes a steering control mechanism 100, an angle coupling mechanism 200, a steering gear and steering transmission mechanism 300, and a control system. An active steering system controller is connected to a steering wheel angle sensor and a steering wheel torque sensor via an analog signal line, connected to other on-board sensors and an coupled motor controller via a CAN bus, and connected to an electromagnet drive amplifier via a switching analog signal line, thereby providing an active steering control of the automobile and fail safety. It should be noted that a hydraulic power steering system and a pinion-and-rack steering gear are used in the present embodiment. However, the active steering system using planetary gear set with less tooth difference according to the present invention can also be equipped with other types of power steering systems (such as electric power steering system, EPS) as needed and steering gears (such as recirculating ball steering gear). Therefore, combining the present active steering system with other types of power steering systems or steering gears should not be considered as an improvement to the present invention.

Figure 1:
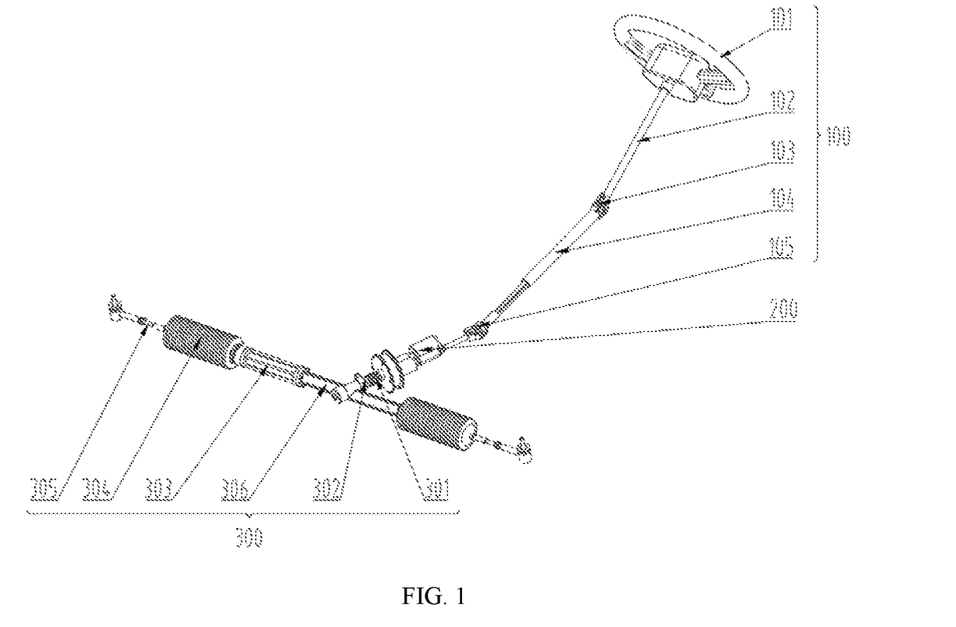
FIG. 1 is an axonometric diagram of an active steering system using planetary gear set with less tooth difference according to the present invention.

As shown in FIG. 1, the steering control mechanism 100 includes a steering wheel 101, a steering shaft 102, a first universal joint 103, a steering transmission shaft 104 and a second universal joint 105. The steering wheel 101 may adopt a three-spoke or four-spoke steering wheel as required. An upper end of the steering shaft 102 is connected to the steering wheel 101 by splines. The steering transmission shaft 104 is assembled by a shaft sleeve formed with a female spline and a shaft formed with a male spline. The length of the steering transmission shaft 104 can be adjusted by the relative sliding between the shaft sleeve and the shaft. An upper end of the steering transmission shaft 104 is connected to the steering shaft 102 via the first universal joint 103, and a lower end of the steering transmission shaft 104 is connected to the angle coupling mechanism 200 via the second universal joint 105. By using the first universal joint 103, the second universal joint 105 and the steering transmission shaft 104 with an adjustable length, it is possible to adapt to the overall layout requirements of different automobile types.

Figure 2:
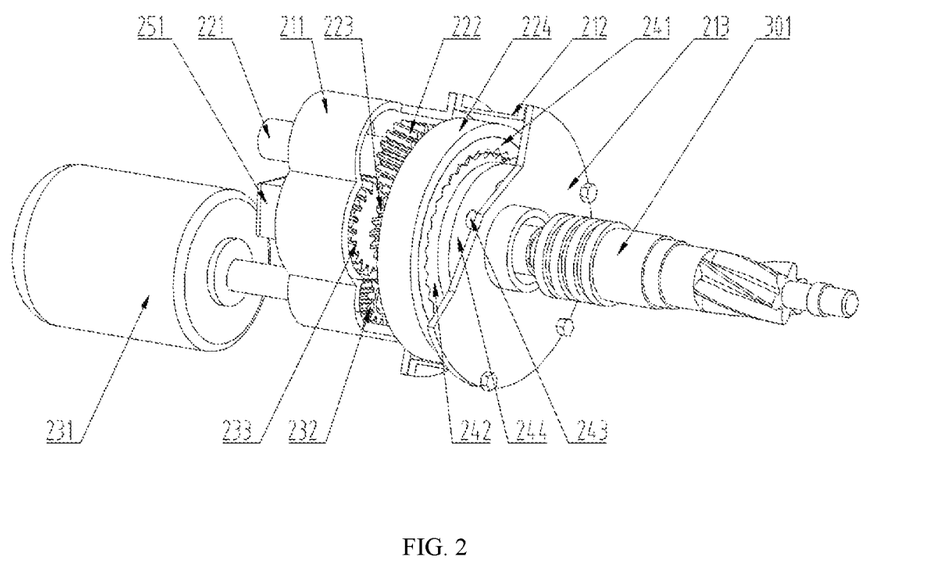
FIG. 2 is an axonometric diagram of an angle coupling mechanism of the active steering system using planetary gear set with less tooth difference according to the present invention.

As shown in FIGS. 1-2, the steering gear and steering transmission mechanism 300 of the present invention includes a rotary valve 301, a steering gear 302, a steering gear case 306, a hydraulic cylinder 303, two tie rods 305 with same structures and two dust covers 304 with same structures. The steering gear 302 includes a steering pinion and a rack. One end of the rack is connected to a piston rod of the hydraulic cylinder 303, and the other end of the rack and the other end of the hydraulic cylinder 303 are respectively connected to ball pins of the two tie rods 305 at left and right sides. The rack of the steering gear 302 is arranged in an inner cavity of the steering gear case 306 and is axially movable in the inner cavity of the steering gear case 306. One end of the steering gear case 306 is fixedly connected to a cylinder body of the hydraulic cylinder 303. The hydraulic cylinder 303 is internally received with the piston rod. The piston rod is axially movable inside the hydraulic cylinder 303 under the dragging of the rack. One end of the dust cover 304 on one side of the hydraulic cylinder 303 is fixed in a ring groove at an end of the hydraulic cylinder 303 by a clamp, and the other end of the dust cover 304 is fixed at a diameter-reduced position on an end of the piston rod. The dust cover 304 achieves a telescopic seal when the piston rod extends out, avoiding a dust entering the hydraulic cylinder. One end of the dust cover 304 at one side of the rack is fixed to a ring groove at an end of the steering gear case 306 by a clamp, and the other end of the dust cover 304 is fixed at a diameter-reduced position on an end of the rack. The dust cover 304 achieves a telescopic seal when the rack extends out, avoiding becoming stuck caused by an entry of a dust into a guide contact surface between the rack and the steering gear case 306. An upper end of the steering pinion of the steering gear 302 is fixedly connected to an output end of the rotary valve 301, and a lower end is meshed with the rack of the steering gear 302. As an embodiment, the rotary valve 301 adopts a conventional constant flow rotary valve, and its input end is connected to an output end of the angle coupling mechanism 200 by splines.

The steering gear, the steering transmission mechanism and the power steering system used in the present invention, in an embodiment, are consistent with the existing rack-and-pinion hydraulic power steering system, which will not be described in detail here.

Figure 3:
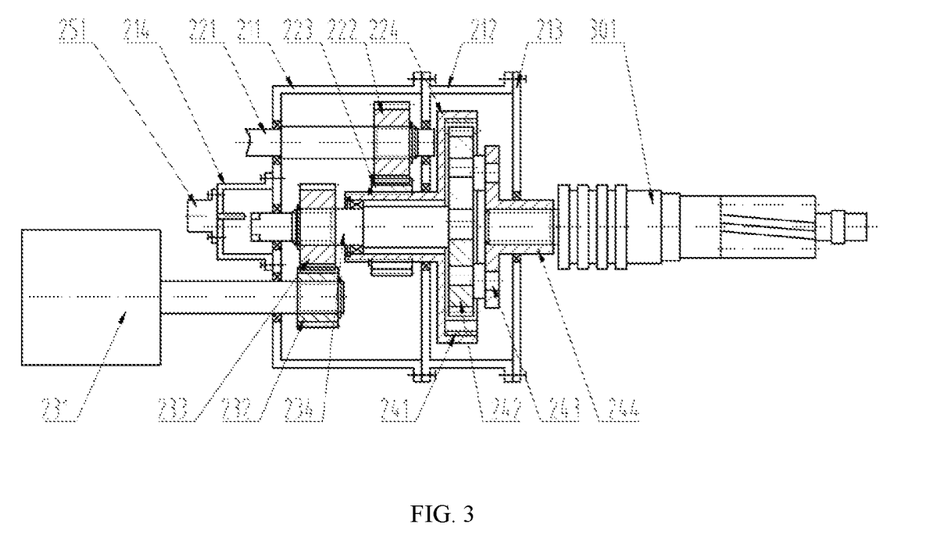
FIG. 3 is a front cross-sectional view of the angle coupling mechanism of the active steering system using planetary gear set with less tooth difference according to the present invention.

The angle coupling mechanism 200 is the key component of the active steering system of the present invention. As shown in FIGS. 2-3, the planetary gear mechanism with less tooth difference has two independent input ends and a common output end. The steering wheel 101, through the steering control mechanism 100 and a steering wheel input shaft 221, controls one input end. A coupled motor 231 controls the other input end. The output end is connected to the rotary valve 301 via a output shaft disk 244. Two power transmission routes are as follows:

Route 1: steering wheel 101-steering shaft 102-first universal joint 103-steering transmission shaft 104-second universal joint 105-steering wheel input shaft 221-first gear 222-second gear 223-ring gear sleeve 224-ring gear 241-planetary gear 242-pin 243-output shaft disc 244-rotary valve 301.

Route 2: coupled motor 231-third gear 232-fourth gear 233-eccentric shaft 234-planetary gear 242-pin 243-output shaft disc 244-rotary valve 301.

Figure 4:
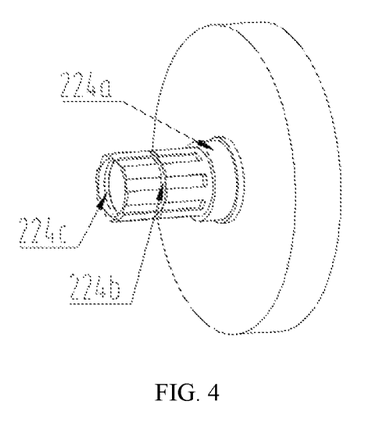
FIG. 4 is an axonometric diagram of a ring gear sleeve of the active steering system using planetary gear set with less tooth difference according to the present invention.

As shown in FIGS. 2-4, a steering wheel power input portion includes a steering wheel input shaft 221, a first gear 222, a second gear 223 and a ring gear sleeve 224. One end of the steering wheel input shaft 221 is connected to the steering control mechanism 100, and the other end is provided with a male spline, and the first gear 222 is provided with a female spline having a slot corresponding to the male spline. The steering wheel input shaft 221 and the first gear 222 are connected by splines. At the same time, two ends of the steering wheel input shaft 221 are supported on a left housing 211 and a right housing 212 by a bearing, respectively. The ring gear 241 is welded in an inner cavity at a large-diameter position of the ring gear sleeve 224. The ring gear sleeve 224 is provided with a male spline at a small-diameter position, and the second gear 223 is provided with a female spline having a slot corresponding to the male spline. The ring gear sleeve 224 and the second gear 223 are connected by splines. The ring sleeve 224 is further provided with a journal 224a at the small-diameter position for mounting the bearing. Two ring grooves 224b and 224c are formed on an inner and outer cylindrical surfaces of the ring sleeve 224 for the mounting of a circlip to realize an axial positioning of the second gear 223 and the other bearing at the inner bore of the ring sleeve 224. The ring gear sleeve 224 is supported on the right housing 212 and an eccentric shaft 234 by bearings respectively.

Figure 5:
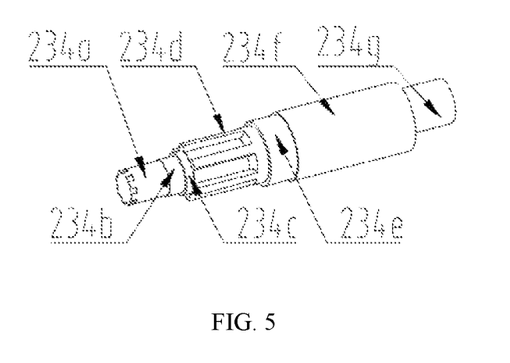
FIG. 5 is an axonometric diagram of an eccentric shaft of the active steering system using planetary gear set with less tooth difference according to the present invention.

As shown in FIGS. 2, 3 and 5, the coupled motor power input portion includes a coupled motor 231, a third gear 232, a fourth gear 233 and a eccentric shaft 234. The output shaft of the coupled motor 231 is provided with a male spline, and the third gear 232 is provided with a female spline having a slot corresponding to the male spline. The output shaft of the coupled motor 231 and the third gear 232 are connected by splines. The eccentric shaft 234 is formed with 7 sections of journal from first end to second end. An first end of a first shaft journal 234a is uniformly provided with grooves. A second shaft journal 234b and a fifth shaft journal 234e are configured to mount bearings so as to be supported on a small diameter inner bore of the left housing 211 and the ring gear sleeve 224 through bearings. A fourth shaft journal 234d is provided with a male spline, and the fourth gear 233 is provided with a female spline having a slot corresponding to the male spline. The eccentric shaft 234 and the fourth gear 233 are connected by splines. An axis of a seventh shaft journal 234g (the boss) is eccentric with the other journal axis. The seventh shaft journal 234g is in clearance fit or needle bearing fit or bushing fit with a center bore of the planetary gear 242.

Figure 6:
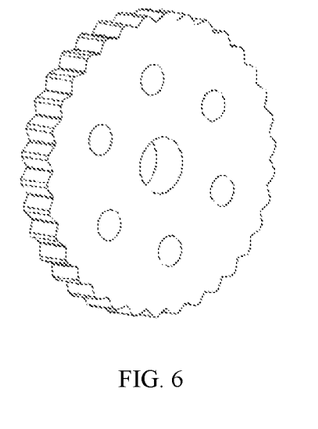
FIG. 6 is an axonometric diagram of a planetary gear of the active steering system using planetary gear set with less tooth difference according to the present invention.
Figure 7:
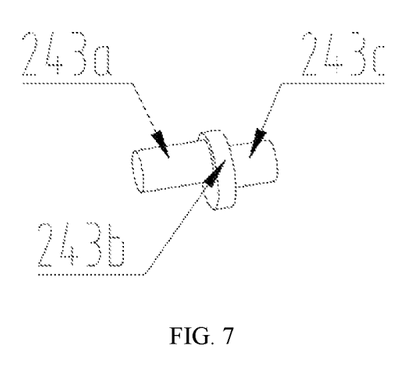
FIG. 7 is an axonometric diagram of a pin of the active steering system using planetary gear set with less tooth difference according to the present invention.
Figure 8:
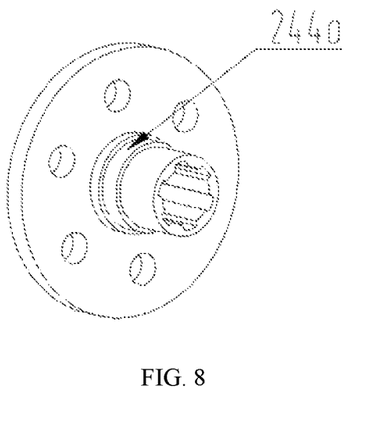
FIG. 8 is an axonometric diagram of an output shaft disc of the active steering system using the small-tooth difference planetary gear mechanism according to the present invention.

As shown in FIGS. 2-3 and 6-8, the planetary gear set with less tooth difference includes a ring gear 241, a planetary gear 242, a pin 243 and an output shaft disk 244. The ring gear 241 and the planetary gear 242 differ by 1 to 4 teeth. The specific tooth difference can be designed according to the requirements for the reduction ratio of the coupled motor 231. The reduction ratio increases as the tooth difference decreases. As shown in FIG. 6, in order to prevent interference of an internal-engaging teeth due to a less tooth difference, tooth profiles of the ring gear 241 and the planetary gear 242 are both formed into a large engaging angle. As shown in FIG. 7, the pin 243 is formed with three journal sections from left to right. A middle section is a second journal 243b with a larger diameter, and a first journal 243a and a third journal 243c each has a smaller diameter. The first journal 243a is eccentric to the second journal 243b and the third journal 243c, and its eccentricity is the same as the eccentricity of the eccentric shaft 234. As shown in FIG. 6, the planetary gears 242 are circumferentially formed with six pin holes which are in clearance fit with the first journal 243a of the pin 243. As shown in FIG. 8, the output shaft disc 244 is also uniformly formed with six pin holes along the circumference which are in clearance fit with the third journal 243c of the pin 243. The journal 244a of the output shaft disc 244 is configured for the mounting of bearing so that the output shaft disc 244 is supported on an end cap 213 by the bearing. The output shaft disc 244 is formed with a female spline having a slot and is connected to the rotary valve 301 by splines.

The centers of the planetary gear 242, the output shaft disk 244, the first journal 243a and the third journal 243c of the pin 243 form a parallelogram, outputting a rotation centering of the planetary gear 242.

It can be seen that the angle coupling mechanism 200 can realize the coupling of the input angle of the steering wheel and the input angle of the coupled motor. By controlling the coupled motor, the steering gear can be provided with an additional steering angle allowing for active steering of the automobile. By matching the tooth number of the first gear 222 and the second gear 223, the tooth number of the third gear 232 and the fourth gear 233, and the tooth number of the ring gear 241 and the planetary gear 242, different transmission ratios from the input end to the output end of the steering wheel and from the input end to the output end of the coupled motor are obtained, adapting to variable steering ratio requirements of different automobiles.

In order to ensure the reliability of the steering system, the active steering system of the present invention is also provided with a fail-safe device. As shown in FIGS. 2-3, when the active steering system is operating normally, the electromagnet 251 is energized, a shear pin compresses an internal reset spring in a retracted state, and the eccentric shaft 234 is rotatable under the control of the coupled motor 231. When the coupled motor 231 fails, the electromagnet 251 is de-energized, the shear pin pops out under the action of the reset spring and gets stuck in the groove at the left end of the eccentric shaft 234, then the eccentric shaft 234 is locked. At this time, the output of the angle coupling mechanism 200 is completely determined by the steering wheel 101, and the normal operation of the steering system is not affected. Further, by adjusting the tooth number of the first gear 222 and the second gear 223, and the tooth number of the ring gear 241 and the planetary gear 242, the transmission ratio of the power transmission route 1 is approximately 1. Therefore, the active steering system using planetary gear set with less tooth difference of the present invention can be easily matched with the existing automobile steering gear.

As shown in FIGS. 2-3, the installation relationship of the angle coupling mechanism 200 of the present invention is as follows. The ring gear sleeve 224 and the ring gear 241 are welded together. The planetary gear 242 meshes with the ring gear 241. The center bore of the planetary gear 242 is in clearance fit with the seventh shaft journal 234g of the eccentric shaft 234. The fifth journal 234e of the eccentric shaft 234 is provided with a bearing for supporting the eccentric shaft 234 on the ring gear sleeve 224. The pin holes uniformly distributed along the circumference of the planetary gear 242 are in clearance fit with the first journal 243a of the pin 243. The pin holes uniformly distributed along the circumference of the output shaft disk 244 are in clearance fit with the third journal 243c of the pin 243. The ring gear sleeve 224, the ring gear 241, the planetary gear 242, the pin 243, the output shaft disk 244 and the eccentric shaft 234 are integrally assembled and installed into the right housing 212 and then the end cap 213 is mounted. The above components are supported on the right housing 212 and the end cap 213 by bearings. The right housing 212 and the end cap 213 are connected by bolts. The second gear 223 and the ring gear sleeve 224 are connected by splines. The first gear 222 is connected to the steering wheel input shaft 221 by splines.

The steering wheel input shaft 221 is supported on the left housing 211 and the right housing 212 by bearings. The third gear 232 and the output shaft of the coupled motor 231 are connected by splines. The fourth gear 233 and the eccentric shaft 234 are connected by splines. The eccentric shaft 234 and the output shaft of the coupled motor 231 are supported on the left housing 211 by the a bearing. The left housing 211 and the right housing 212 are connected by bolts. The electromagnet 251 is arranged on the electromagnet box 214 by bolts. The electromagnet box 214 is arranged on the left housing 211 by bolts. The left housing 211, the right housing 212, the end cap 213 and an outer housing of the coupled motor 231 are all fixed to an automobile body.

By adding an angle coupling mechanism on the steering shaft, the active steering system using planetary gear set with less tooth difference of the present invention is possible to apply a steering angle which is independent of a steering angle applied by the driver through the steering wheel to the steering gear and then correct the front wheel steering angle according to the running condition of the automobile. The active steering system using planetary gear set with less tooth difference has a simple structure.

Figure 9:
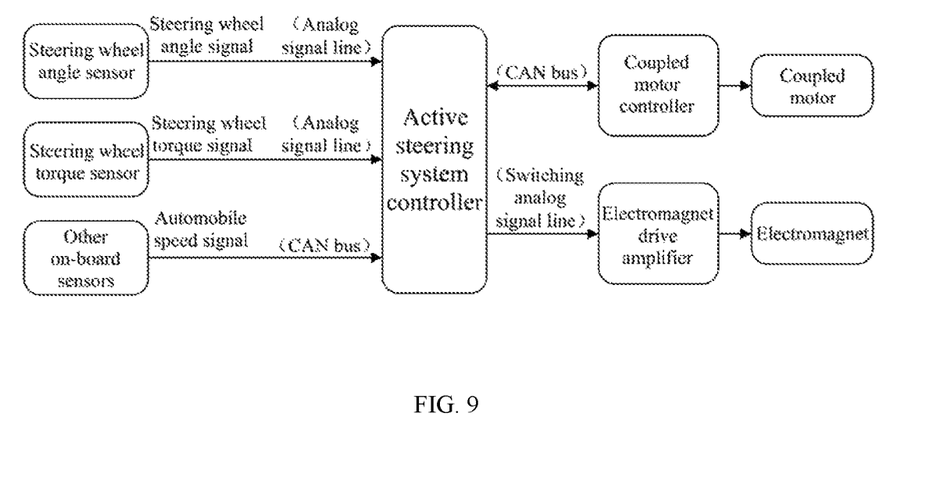
FIG. 9 is a diagram showing the electrical connection relationship of the active steering system using a small-tooth difference planetary gear mechanism according to the present invention.

As shown in FIG. 9, the present invention also provides a method for controlling the active steering system using planetary gear set with less tooth difference. The active steering system controller is connected to the angle sensors and torque sensors of the steering wheel through the analog signal line. The measured angle and torque signal are read. Other driving state signals such as automobile speed signals are acquired through the CAN bus. The coupled motor 231 is controlled to output an appropriate steering angle to realize active steering of the automobile. At the same time, the electromagnet 251 is controlled to turn on and off by a switching analog signal line to realize an anti-failure protection.

Figure 10:
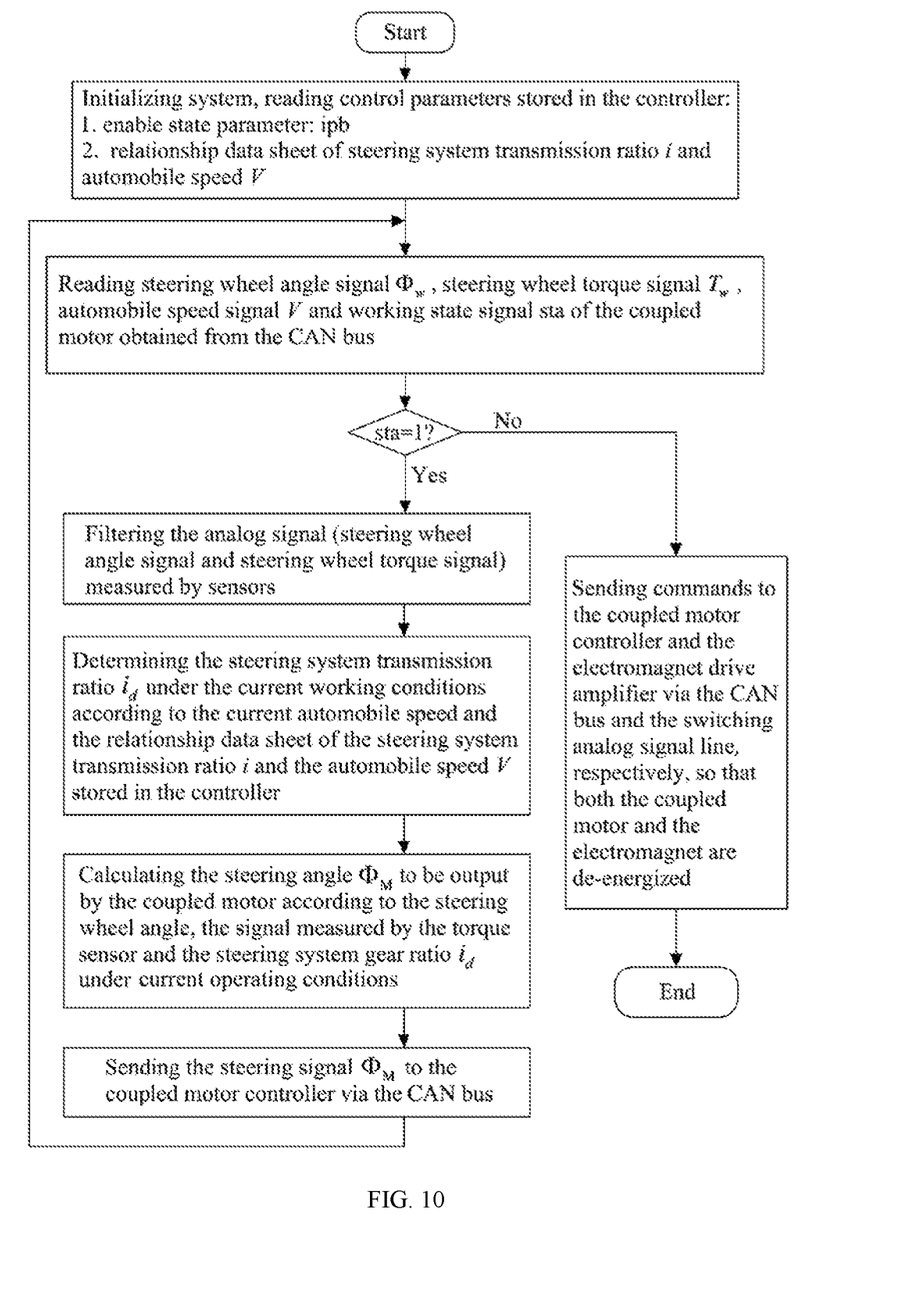
FIG. 10 is a flow chart of a method for controlling the active steering system using a small-tooth difference planetary gear mechanism according to the present invention.

As shown in FIG. 10, the active steering system controller of the present invention stores corresponding control software therein, and the specific working process is as follows.

Step 1. initializing the active steering system controller after power-on, finishing the self-checking process, and reading control parameters; the control parameters include:

1) enable state parameter ipb of the active steering system: the automobile is re-ignited, after the active steering system controller is powered on, the enable state parameter ipb is a default value of 1, that is, the automobile is in a startup state.

2) a relationship data sheet of the steering system transmission ratio i and the automobile speed V.

Step 2. Reading, by the active steering system controller, signals of each sensor including: steering wheel angle signal $\Phi_w(°)$, steering wheel torque signal $T_w(N)$, automobile speed signal V (km/h) and working state signal sta of the coupled motor obtained from the CAN bus; where sta is 1 during normal operation, and sta is 0 when the coupled motor fails.

Step 3. Determining the working state of the coupled motor; if sta=1, the coupled motor works properly, and step 4 is performed; if sta=0, the coupled motor fails, then step 8 is performed.

Step 4. Filtering the analog signal (steering wheel angle signal and steering wheel torque signal) measured by the sensors. Preferably, Kalman filtering is performed. Other filtering methods are not considered improvements of the present invention.

Step 5. Determining the steering system transmission ratio $i_d$ under the current working conditions according to the current automobile speed and the relationship data sheet of the steering system transmission ratio i and the automobile speed V stored in the active steering system controller.

Step 6. Calculating the steering angle $\Phi_M$ to be output by the coupled motor according to the steering wheel angle, the signal measured by the torque sensors and the steering system gear ratio $i_d$ under current operating conditions.

Step 7. Sending the steering signal $\Phi_M$ to the coupled motor controller by the CAN bus and returning to step 2 for the next cycle.

Step 8. Sending commands to the coupled motor controller and the electromagnet drive amplifier through the CAN bus and the switching analog signal line respectively, so that both the coupled motor and the electromagnet are de-energized. The coupled motor stops working, the electromagnet is de-energized, and the shear pin pops out under the action of the spring to lock the eccentric shaft.

The method for controlling the active steering system using planetary gear set with less tooth difference of the present invention determines the steering angle output by the coupled motor through collecting the driving condition of the automobile via the active steering system controller, realizing the active steering of the automobile.

Differences between the various embodiments are described in the above embodiments of the present application. Various optimal features of the embodiments may be combined to form a preferred embodiment.

The embodiments are only illustrative of the present application, and are not intended to limit the application. It should be understood that for one of ordinary skill in the art, improvements or variations can be made based on the above descriptions, and such improvements and variations fall within the scope of the appended claims.

What is claimed is:

1. An active steering system using planetary gear set with less tooth difference, comprising:
   a first input shaft, wherein one end of the first input shaft is connected to a steering wheel of an automobile, and the other end of the first input shaft is fixedly sleeved with a first gear;
   a ring gear sleeve, wherein a ring gear is fixedly mounted in the ring gear sleeve in a circumferential direction, and a hollow shaft protrudes from a center of an end of the ring gear sleeve and is fixedly sleeved with a second gear that is engageable with the first gear;
   a second input shaft, wherein one end of the second input shaft is fixedly connected to an output end of a coupled motor, and the other end of the second input shaft is fixedly sleeved with a third gear;
   an eccentric shaft, wherein one end of the eccentric shaft is fixedly sleeved with a fourth gear that is engageable with the third gear, and the other end of the eccentric shaft is sleeved in the hollow shaft;
   a planetary gear engaging with and rotating relative to the ring gear, wherein the planetary gear is provided with a plurality of first pin holes spaced apart in a circumferential direction; the eccentric shaft is eccentrically provided with a boss engaged with a center bore of the planetary gear in a clearance fit;
   a plurality of pins each including a first journal, a second journal and a third journal, wherein the first journal is arranged to be eccentric to the second journal, the second journal is arranged to be concentric to the third journal, and the first journal is engaged with one of the plurality of the first pin holes in a clearance fit; and
   an output shaft disc provided with a plurality of second pin holes spaced apart in a circumferential direction, wherein the third journal is engaged with one of the plurality of second pin holes in a clearance fit, and the output shaft disc is fixedly connected to a steering gear of the automobile.

2. The active steering system according to claim 1, wherein
an eccentricity between the eccentric shaft and the boss is the same as an eccentricity between the first journal and the second journal.

3. The active steering system according to claim 1, wherein
one end of the eccentric shaft is provided with a first shaft journal; and a plurality of grooves spaced apart are arranged at an end of the first shaft journal away from the eccentric shaft in a circumferential direction.

4. The active steering system according to claim 3, further comprising:
an electromagnet axially provided with a shear pin, wherein a spring is arranged between the electromagnet and the shear pin;
when the electromagnet is de-energized, the shear pin moves away from the electromagnet by resilience of the spring and engages with one of the plurality of grooves, such that the eccentric shaft is locked; when the electromagnet is energized, the shear pin compresses the spring to move towards the electromagnet and is disengaged from one of the plurality of grooves, such that the eccentric shaft is unlocked.

5. The active steering system according to claim 1, further comprising:
a first ring groove arranged at an end of the hollow shaft away from the ring gear sleeve and provided with a first circlip for axially fixing the eccentric shaft;
a second ring groove arranged outside the hollow shaft between the first ring groove and the ring gear sleeve and provided with a second circlip for axially fixing the second gear.

6. The active steering system of claim 4, further comprising:
a first housing;
a second housing detachably connected to the first housing;
an electromagnet box fixedly disposed on the first housing, wherein the electromagnet is fixedly disposed on the electromagnet box;
a hollow connecting shaft protruding from a center of an end of the output shaft disc for fixed connection to the steering gear of the automobile;
wherein two ends of the first input shaft are rotatably supported on the first housing and the second housing, respectively; an end of the second input shaft is rotatably supported on the first housing; one end of the eccentric shaft is rotatably supported on the first housing, and the other end of the eccentric shaft is rotatably supported in the hollow shaft; the hollow shaft is rotatably supported on the second housing; the hollow connecting shaft is rotatably supported on the second housing.

7. The active steering system according to claim 5, further comprising:
a rotary valve fixedly connected to the hollow connecting shaft;
the steering gear, including a steering pinion and a steering rack, an upper end of the steering pinion being fixedly connected to an output end of the rotary valve;
a steering gear case, wherein the steering rack is arranged in the steering gear case, a lower end of the steering pinion engages with the steering rack, and the steering pinion is axially movable along the steering gear case;
a hydraulic cylinder, wherein an end of the hydraulic cylinder is fixedly connected to an end of the steering gear case;
wherein the hydraulic cylinder is provided with a piston rod; one end of the piston rod is fixedly connected to one end of the steering rack and the other end of the piston rod is connected to a first tie rod; and the other end of the steering rack is connected to a second tie rod;
a first dust cover sleeved on the hydraulic cylinder, wherein one end of the first dust cover is sealingly connected to another end of the hydraulic cylinder, and the other end of the first dust cover is sealingly connected to a diameter-reduced position of an end of the piston rod;
a second dust cover sleeved on the steering gear case, one end of the second dust cover being sealingly connected to another end of the steering gear case, and the other end of the second dust cover being sealingly connected to a diameter-reduced position of an end of the steering rack.

8. The active steering system according to claim 5, further comprising:
a steering shaft, wherein an end of the steering shaft is fixedly connected to the steering wheel of the automobile;
a steering transmission shaft, wherein one end of the steering transmission shaft is connected to another end of the steering shaft via a first universal joint and the other end of the steering transmission shaft being connected to the first input shaft via a second universal joint.

9. A method for controlling the active steering system of claim 1, comprising:
S1: acquiring, by the CAN bus, an automobile speed;
S2: acquiring a steering system transmission ratio by reading a relationship data sheet of the steering system transmission ratio and the automobile speed;
S3: collecting, by the active steering system controller, signals of each sensor including a steering wheel angle signal and a steering wheel torque signal;
S4: calculating a steering angle to be output by the coupled motor according to the steering wheel angle signal, the steering wheel torque signal, and the steering system transmission ratio under current operating conditions;
S5: controlling, by the coupled motor controller, the coupled motor to output the steering angle to realize active steering of the automobile.

10. The method according to claim 9, further comprising:
before S2, determining the working state of the coupled motor; then, if the coupled motor fails, controlling, by the coupled motor controller, the coupled motor to stop working and the electromagnet to de-energize; wherein the shear pin pops out to lock the eccentric shaft.

* * * * *